United States Patent
Butzerin et al.

(10) Patent No.: US 12,353,193 B2
(45) Date of Patent: Jul. 8, 2025

(54) METHOD AND APPARATUS FOR OPERATING A MACHINE WITH A TOOL

(71) Applicant: Siemens Aktiengesellschaft, Munich (DE)

(72) Inventors: Andre Butzerin, Bührs (AT); Daniel Schall, Hollabrunn (AT); Stefan Trabesinger, Raaba-Grambach (AT)

(73) Assignee: Siemens Aktiengesellschaft, Munich (DE)

( * ) Notice: Subject to any disclaimer, the term of this patent is extended or adjusted under 35 U.S.C. 154(b) by 382 days.

(21) Appl. No.: 17/917,588

(22) PCT Filed: Apr. 7, 2021

(86) PCT No.: PCT/EP2021/059068
§ 371 (c)(1),
(2) Date: Oct. 7, 2022

(87) PCT Pub. No.: WO2021/204879
PCT Pub. Date: Oct. 14, 2021

(65) Prior Publication Data
US 2023/0141816 A1  May 11, 2023

(30) Foreign Application Priority Data
Apr. 9, 2020 (EP) ..................... 20168914

(51) Int. Cl.
*G05B 19/4155* (2006.01)
*B23Q 15/12* (2006.01)

(52) U.S. Cl.
CPC ......... *G05B 19/4155* (2013.01); *B23Q 15/12* (2013.01); *G05B 2219/35519* (2013.01)

(58) Field of Classification Search
None
See application file for complete search history.

(56) References Cited

U.S. PATENT DOCUMENTS

| | | |
|---|---|---|
| 2019/0098035 A1 | 3/2019 | Periaswamy et al. |
| 2019/0210176 A1 | 7/2019 | Yamamoto |

(Continued)

FOREIGN PATENT DOCUMENTS

| | | |
|---|---|---|
| CN | 114930256 | 8/2022 |

OTHER PUBLICATIONS

PCT International Search Report dated Jul. 1, 2021 based on PCT/EP2021/059068 filed Apr. 7, 2021.

*Primary Examiner* — Ryan A Jarrett
(74) *Attorney, Agent, or Firm* — Cozen O'Connor (57) ABSTRACT

Apparatus and method for operating a machine with a tool, wherein the method includes capturing at least one operating data point for the machine and/or the tool, calculating at least one estimate value from the at least one operating data point based on an ML model, determining an anomaly in the form of a discrete-time anomaly value based on the at least one estimate value via a comparison with a predetermined comparison value for the at least one estimate and detection of a match for the estimate comparison, storing the discrete-time anomaly value in a memory and aggregating the trend in the anomaly value over time to form a smoothed anomaly value, comparing the smoothed anomaly value with at least one predetermined comparison value for the anomaly and detecting a match for the anomaly comparison, and outputting a control operation to the machine based on the smoothed anomaly value.

12 Claims, 8 Drawing Sheets

(56) References Cited

U.S. PATENT DOCUMENTS

| | | |
|---|---|---|
| 2019/0294144 A1 | 9/2019 | Takahara et al. |
| 2020/0082245 A1 | 3/2020 | Hao et al. |
| 2020/0104224 A1 | 4/2020 | Katou |
| 2021/0302042 A1* | 9/2021 | Slimacek ................. F24F 11/38 |
| 2022/0401853 A1 | 12/2022 | Nerurkar |

* cited by examiner

METHOD AND APPARATUS FOR OPERATING A MACHINE WITH A TOOL

CROSS-REFERENCE TO RELATED APPLICATIONS

This is a U.S. national stage of application No. PCT/EP2021/059068 filed 7 Apr. 2021. Priority is claimed on European Application No. 20168914.8 filed 9 Apr. 2020, the content of which is incorporated herein by reference in its entirety.

BACKGROUND OF THE INVENTION

1. Field of the Invention

The invention relates to a method and an apparatus for operating a machine with a tool.

2. Description of the Related Art

The automatic tool breakdown monitoring (TBM) is an important technology for unmanned workshops and automatic production lines for CNC processing. A tool breakdown may result in the tool or the machine and/or the processed workpiece becoming damaged and in machine downtimes.

Current solutions frequently take into consideration sensor data from a machine tool, such as force and vibration sensors, and monitor the operation of the machine on a threshold value basis, i.e., a monitoring of minimum and maximum values occurs in the signals, such as a spindle power.

Here, these solutions are frequently complex and can cause false alarms, because hard coded alarm limits of specific operating behavior are not taken into consideration. Furthermore, the output of alarms is not always triggered, even when a critical situation is reached.

An incorrect alarm or no alarm at all may result in an unwanted stoppage of machines, but also in damage to the machine, tool or workpiece.

US 2020/0104224 A1 discloses an anomaly is detected based on recorded data, by a detected anomaly being trained with the aid of machine learning and, when further anomalies are detected, which have increased noise components in the underlying sensor data, being used in each case for comparison purposes, in order thus to improve the detection rate of anomalies in the production of workpieces, and to identify the workpieces accordingly.

It is, however, not assumed that anomalies that increase in size over the course of time, or anomalies that are also caused by wear or manufacturing parameters of the machine, are to be reduced or avoided.

For instance, the tools used are to be protected against damage or excess wear, if an excessively high feed speed of a CNC milling machine exists. With a corresponding intervention into the production or the manufacturing process, the availability of the tool or the machine is to be improved. A manufacturing process can therefore be adjusted accordingly to an increasingly ageing or wearing tool state.

SUMMARY OF THE INVENTION

It is an object of the invention to provide a method and an apparatus for automatically monitoring a machine with a tool, as a result of which operation is possible with improved availability.

In other words, a predictive and purporting operation of a machine is to be enabled with a tool.

A precautionary operation is understood to mean the ability with which a tool breakdown is detected and the current process, such as for instance drilling or milling, is stopped in order to avoid damage to the workpiece.

In doing this, a machine stoppage may occur, but the processing of the workpiece can be continued with a new tool.

With a predictive operation, an attempt is made to promptly predict a tool breakdown in order to avoid damage to the workpiece or the tool.

A machine stoppage may occur, but the workpiece processing can be continued with the same or a new tool.

With a purporting operation, a tool breakdown is to be promptly predicted and countermeasures are to be taken in order to prevent a tool breakdown and a machine stoppage.

These and other objects and advantages are achieved in accordance with the invention by a method, where the method comprises:
a) capturing at least one operating data point for the machine and/or the tool,
b) calculating at least one estimate value from the at least one operating data point based on machine learning (ML) model,
c) determining an anomaly in the form of a discrete-time anomaly value based on the at least one estimate value via a comparison with a predetermined comparison value for the at least one estimate and detection of a match for the estimate comparison,
d) storing the discrete-time anomaly value in a memory and aggregating the trend in the anomaly value over time to form a smoothed anomaly value,
e) comparing the smoothed anomaly value with at least one predetermined comparison value for the anomaly and detecting a match for the anomaly comparison, and
f) outputting a control operation to the machine on the basis of the smoothed anomaly value, where the control operation preferably acts on the operation of the machine and/or the tool that is detected by the at least one operating data point.

In the statistics, an anomaly (also "outlier") is an observation or an event that deviates so significantly from other events that it is suspected that it was produced by another mean value.

Anomalies in a large data record can follow very complicated patterns which, in most instances, can only be identified with difficulty.

With the method in accordance with invention, it is possible for a predictive and purporting operation of a machine with a tool to occur with a high level of availability.

Contrary to the prior art, it is not only possible to reliably detect an unwanted anomaly but instead to also promptly introduce a corresponding counter measure and as a result to improve the availability of the tool or the machine so that an anomaly no longer exists in a correspondingly adjusted continuation of the manufacturing process.

For instance, the manufacturing process can be modified accordingly in accordance with an anomaly detection, or an alternative processing of the workpiece is initiated, such as by using another tool, changing a process parameter such as the speed or the propulsion speed of a CNC milling machine, or also increasing the flow of coolant.

In other words, a detected anomaly can be used to deliver notifications as to the degree of wear of a machine or a tool, for instance.

It is therefore not the anomaly on a workpiece that is of interest per se to improving the prior art, but instead the machine or the tool that produces the workpiece. The anomaly is used as a corresponding measure herefor.

This is achieved because in step c) the anomaly is determined based on the estimate value. In other words, the estimate value is itself used as a measure for detecting an anomaly without directly assessing the current data points. As a result, it is possible, for instance, to promptly detect the wear of a machine or a tool.

In one embodiment of the invention, at least two operating data points are captured and further processed. As a result, the operation of the machine can be monitored more precisely and parameter combinations can be detected.

In another embodiment of the invention, at least two estimate values are calculated and further processed. As a result, anomalies can be detected in a redundant manner.

In a further embodiment of the invention, the at least one operating data point is a rotary or displacement speed, a torque, a current consumption or a temperature. As a result, operation of the machine can be monitored precisely and in a particularly simple manner.

In another embodiment of the invention, the at least one estimate value is calculated via a Long Short-Term Memory (LSTM) network. As a result, anomalies can be detected easily.

In yet another embodiment of the invention, the discrete-time anomaly value is determined via an "isolation forest" algorithm. As a result, anomalies can be detected in a simple and particularly efficient manner.

An isolation forest is an unsupervised learning algorithm for detecting anomalies that is based on the principle of the isolation of anomalies instead of the most current techniques of profiling normal points.

The most usual techniques for detecting anomalies are based on the creation of a trend for that which is "normal". Anomalies are registered as such instances in the data record that do not correspond to the normal trend.

Isolation forest uses another approach: instead of attempting to create a model for normal instances, anomalous points are isolated explicitly in the dataset. The main advantage of this approach consists in the possibility of using scanning techniques to an extent which is not permissible for the trend-based methods, as a result of which a very rapid algorithm is produced with a minimal storage requirement.

In a further embodiment of the invention, the smoothed anomaly value occurs via forming a temporal average value. As a result, anomalies can be detected precisely and in a very simple manner.

In a still further embodiment of the invention, the comparison value in step e) is determined by a method that is based on machine learning, such as a decision tree, a Bayesian network, a neural network, a multi-class support vector machine or a k-nearest neighbor classification.

In another embodiment of the invention, at least one operating characteristic number is taken into consideration in the comparison in step f).

It is also an object of the invention to provide an apparatus comprising a sensor module with at least one sensor for executing step a), an estimate module for executing step b), an anomaly detection module for executing step c), a storage module for implementing the storage described in step d), a decision module for executing step e), and an output module for executing step f), where the apparatus is configured to execute the method in accordance with the disclosed embodiments of the invention.

In an embodiment of the invention, for a further auxiliary data module is included, which is applied when step e) is executed.

It should be understood the cited modules are connected with one another, either directly or indirectly, for communication purposes.

In another embodiment of the invention, the estimate module, the anomaly detection module, the storage module and the decision module are placed on an edge that is also included in the apparatus and connected thereto.

This means that the operation can be monitored with a particularly high availability, because a local operation is possible.

The apparatus thus further developed can therefore be a distributed system that has components such as sensors, which are arranged on the machine, for instance, and further modules (such as an auxiliary data module), which are included in an edge computing apparatus and are executed there. The individual components and modules are connected to one another and communicate with one another.

With a system distributed in such a way, the cited modules can be used together for the operation of several machines, which renders the system simpler, more cost-effective and reliable. Moreover, no operating data has to be stored in a cloud, as a result of which the data security and privacy are improved.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of an exemplary embodiment shown in the appended drawings, in which.

DETAILED DESCRIPTION OF THE EXEMPLARY EMBODIMENTS

Figure 1:
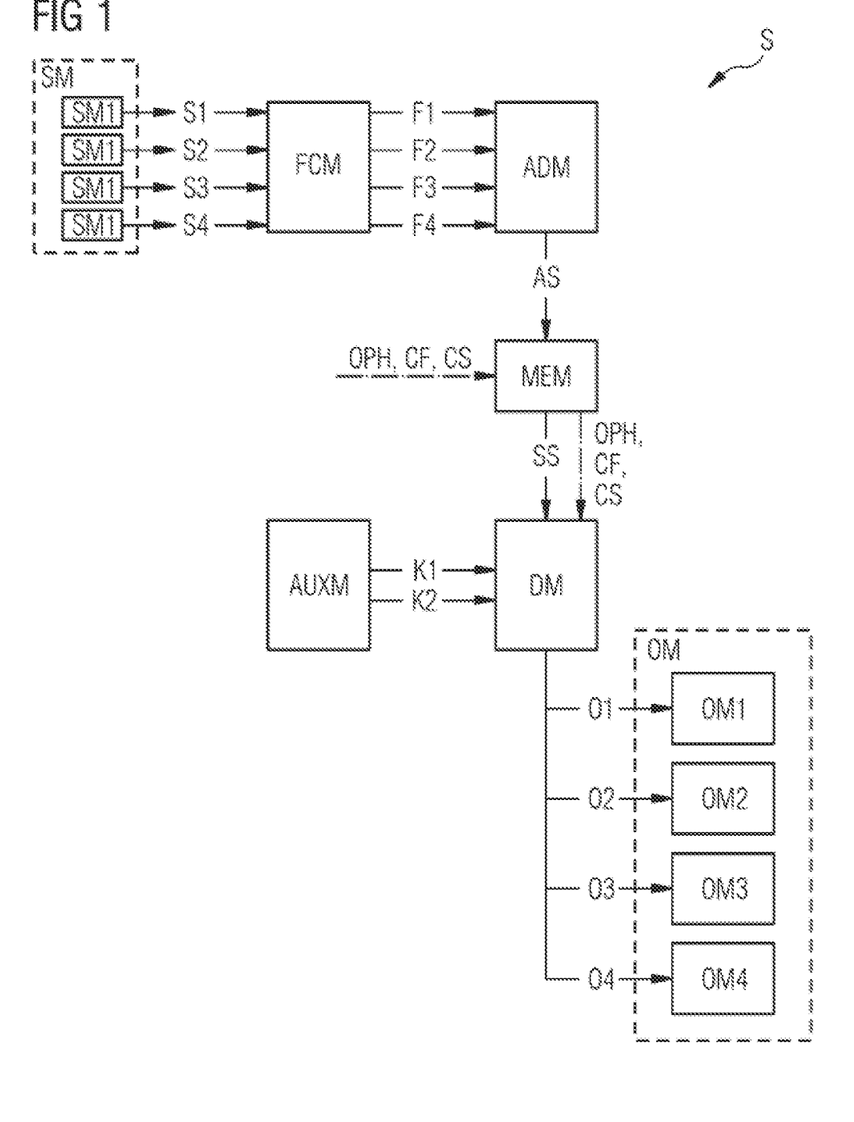
FIG. 1 shows a symbolic representation of an exemplary embodiment of the inventive method.

FIG. 1 show an exemplary embodiment of the invention in the form of an inventive apparatus, which is configured to execute the method in accordance with the invention.

The method includes:

a) capturing at least one operating data point S1-S4 for the machine and/or the tool,
b) calculating at least one estimate value F1-F4 from the at least one operating data point S1-S4 based on a machine learning (ML) model,
c) determining an anomaly in the form of a discrete-time anomaly value AS based on the at least one estimate value F1-F4 via a comparison with a predetermined comparison value for the at least one estimate and detection of a match for the estimate comparison,
d) storing the discrete-time anomaly value AS in a memory and aggregating the trend in the anomaly value AS over time to form a smoothed anomaly value SS,
e) comparing the smoothed anomaly value SS with at least one predetermined comparison value for the anomaly and detecting a match for the anomaly comparison,
f) outputting a control operation O1-O4 to the machine based on the smoothed anomaly value SS, where the control operation preferably has an effect on the operation of the machine and/or tool, which is captured by the at least one operating data point S1-S4.

A control loop may therefore optionally be created, in order to monitor a continuous operation and in order to ensure the output quality of the workpieces despite a machine or tool state that changes over time, by manufacturing parameters of the machines or tools being monitored and adjusted accordingly.

It should be understood that via the described manner, material tolerances of the workpiece blank, such as alloy ratios, can be monitored accordingly and can be included in a correspondingly adjusted manufacturing process.

It is particularly favorable if at least two operating data points S1-S4 are captured and further processed, because the probability of detecting an anomaly detection increases as a result. Therefore, a number of data points can be aggregated to form a shared data source, which can form a new data point.

The control operation optionally acts on the operation of the machine and/or the tool, which is captured by the at least one operating data point. As a result, a future anomaly can be reduced or avoided, for instance, by prompt exchange of a relevant, worn tool. Further embodiments of this are cited in the description relating to FIG. 2.

Consequently, it is therefore also favorable if at least two estimate values F1-F4 are calculated and further processed.

An operating data point S1-S4 can be a rotary or displacement speed, a torque, a current consumption or a temperature, for instance. As a result, a combinational evaluation of a number of manufacturing parameters is possible, for instance, synergistic effect of the temperature of the workpiece and the temperature of the tool at a manufacturing time instant.

The estimate values F1-F4 can be calculated, for instance, via a LSTM network.

The discrete-time anomaly value AS can be calculated, for instance, using an "isolation forest" algorithm.

The smoothed anomaly value SS can be determined, for instance, by forming a temporal average value.

The comparison value in step e) can be determined, for instance, via a method that is based on machine learning, such as a decision tree, a Bayesian network, a neural network, a multi-class support vector machine (SVM) or a k-nearest neighbor classification (kNN).

Furthermore, at least one operating characteristic number K1, K2 can be taken into consideration in the comparison in step f).

The apparatus for operating a machine with a tool comprises
a sensor module SM with at least one sensor SM1-SM4 for executing step a),
an estimate module FCM for executing step b),
an anomaly detection module ADM for executing step c),
a storage module MEM for implementing the storage described in step d)
a decision module DM for executing step e), and an output module OM1-OM4 for executing step f), and
an auxiliary data module AUXM that is applied when the step is executed in order to take into consideration the operating characteristic number K1, K2.

The machine is not shown in the figure for a better overview.

It should be understood that the at least one sensor is connected accordingly with the machine, in order to capture sensor data of the machine.

The output modules OM1-OM4 represent the operating state of the machine, supply information about the necessary maintenance or repair work and can also be formed by a shared output module OM.

Figure 2:
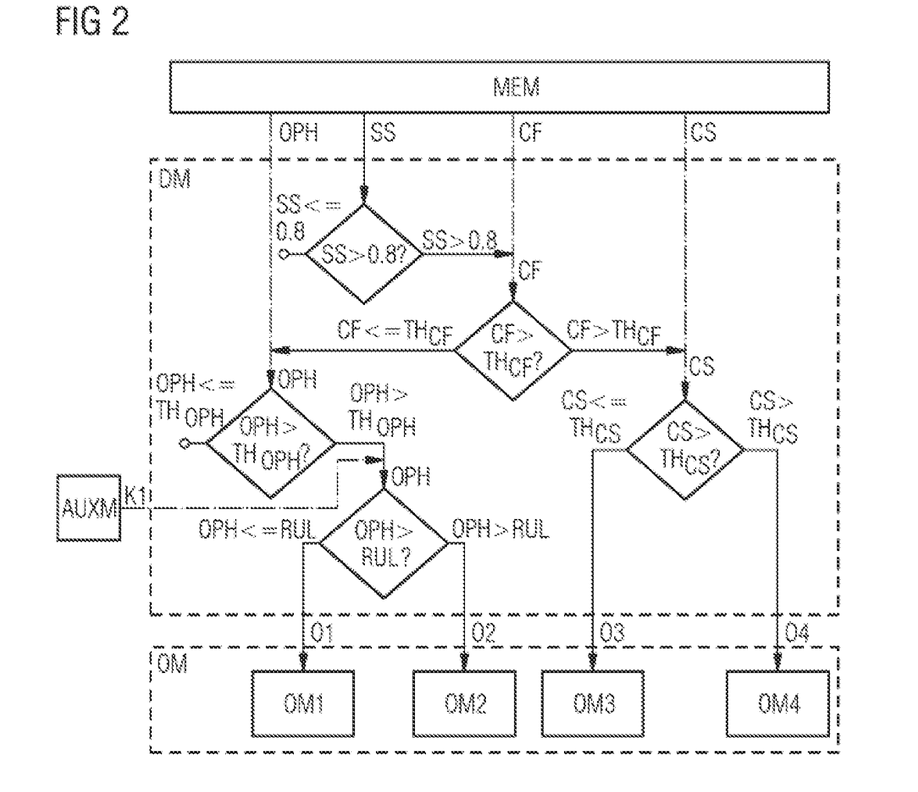
FIG. 2 shows an example of a flow chart of the decision module of FIG. 1.

FIG. 2 shows an example of a flow chart of the decision module DM from the preceding figure.

The storage module provides the decision module DM with the smoothed anomaly value SS.

A check is performed to determine whether the smoothed anomaly value SS lies within a value range, i.e., is larger than the edge value 0.8, which corresponds to a first predetermined comparison value for the anomaly. A detection of a match for the anomaly comparison therefore occurs. If this is not the case, then there is no anomaly and the machine can operate further.

If the edge value is exceeded, however, an attempt is consequently made to determine the cause of the anomaly more precisely. This is accomplished by a comparison with operating variables.

A check is performed to determine whether a cutting force lies below a predetermined threshold value $TH_{CF}$. If yes, then a check is also performed to determine whether the maximum provided operation hours OPH were reached for the machine, by a comparison being performed with a predetermined threshold value $TH_{OPH}$. By taking into consideration the operating characteristic number K1, which comprises a remaining useful lifetime and is provided by the auxiliary data module AUXM, a further check is performed to determine whether the operating hours OPH are still within the remaining useful life RUL.

The characteristic number K1, K2 can also be another, what is known as "key performance indicator" KPI of the machine. If this is the case, then an output O1 "check tool uptake" can take place by way of the output module OM1. Otherwise, an output O2 "replace tool" can take place via the output module OM2.

If the check of the cutting force CF lies above a predetermined threshold value $TH_{CF}$, then a check is further performed to determine whether a cutting speed CS lies below a predetermined threshold value $TH_{CS}$. If this applies, then an output O3 "check lubrication" can occur via the output module OM3. Otherwise, an output O4 "Check CNC program/model" can occur via the output module OM4.

The cutting force CF, the cutting speed CS and the maximum provided operation hours OPH can be provided via the storage module MEM, for instance, or also directly by a corresponding sensor SM1-SM4, which is connected with the machine in each case.

Figure 3:
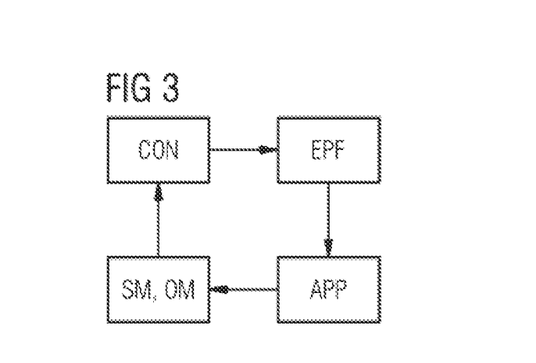
FIG. 3 shows a symbolic representation of a control loop in accordance with the invention.

FIG. 3 shows an example of a control loop of the machine with an inventive apparatus, namely for outputting a control operation O1-O4 based on the smoothed anomaly value SS on the machine, where optionally the control operation acts on the operation of the machine and/or the tool which is detected by the at least one operating data point S1-S4.

A control system CON uses a sensor module SM to detect relevant variables for capturing different operating properties. The control system CON delivers this data to an edge platform EPF, in which the evaluation of the operating data points S1-S4 is implemented via one or more application programs APP.

In other words, in this example the estimate module FCM, the anomaly detection module ADM, the storage module MEM and the decision module DM are optionally placed on the edge platform EPF.

The application programs APP comprise algorithms that are based on machine learning and control the machine via the output module OM using corresponding actuators or displays. As a result, an arrangement is created with a control loop, with which the operation of the machine can take place with the tool in an optimal manner.

The components shown illustrate an example of a distributed, networked system, which is arranged on the edge EPF and close to the machine. Depending on requirements, other distributions of the components may also be advantageous.

FIG. 4 to FIG. 8 show examples of operating nominal sizes which can form the operating data points S1-S4.

Figure 4:
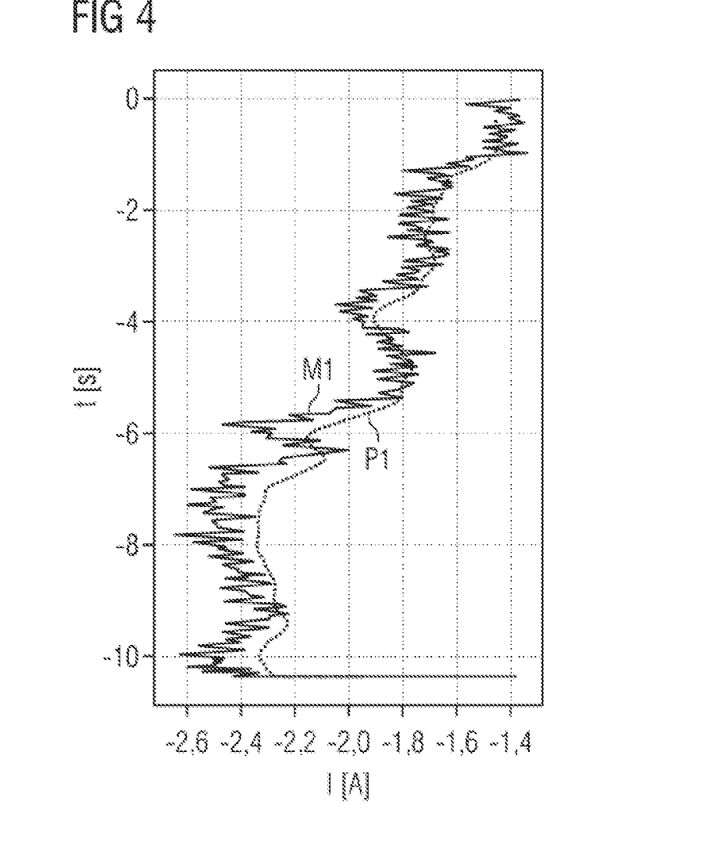
FIGS. 4-5 show graphical plots of exemplary temporal representations of current trends of a machine.

FIG. 4 shows a trend of a current consumption of the machine over time, in this example the consumption current of the spindle of a CNC machine. Here, the measured current is plotted in the curve M1.

In the curve P1, the forecast, smoothed score can be detected, which can form an example of the smoothed anomaly value SS according to the preceding figures.

Figure 5:
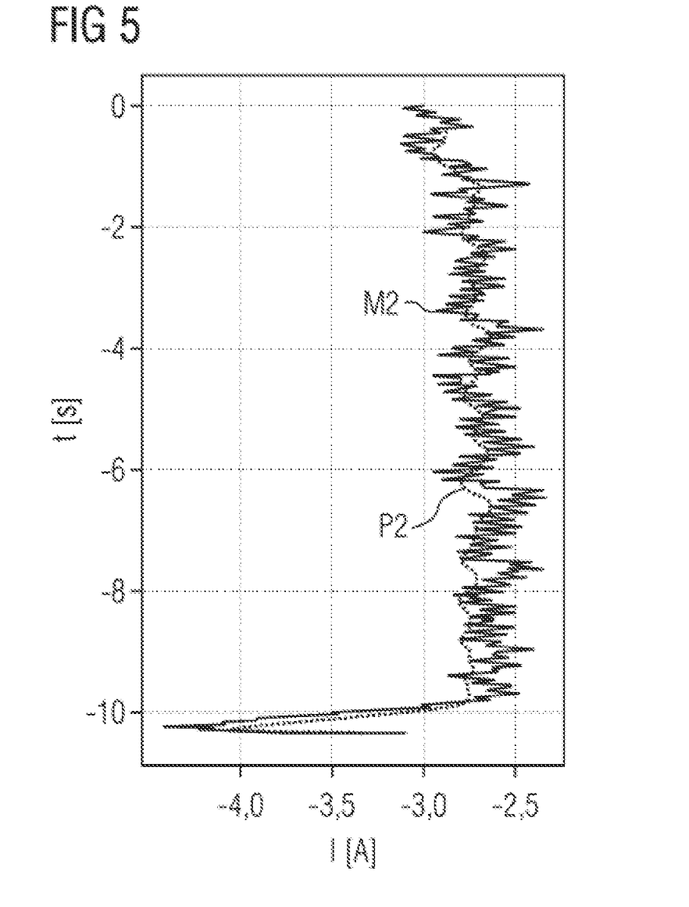

FIG. 5 shows a trend of a further current consumption of the machine over time. Here, the measured current is plotted in the curve M2.

In the curve P2, the smoothed score can be detected, which can in turn form an example of the smoothed anomaly value according to the preceding figures.

Figure 6:
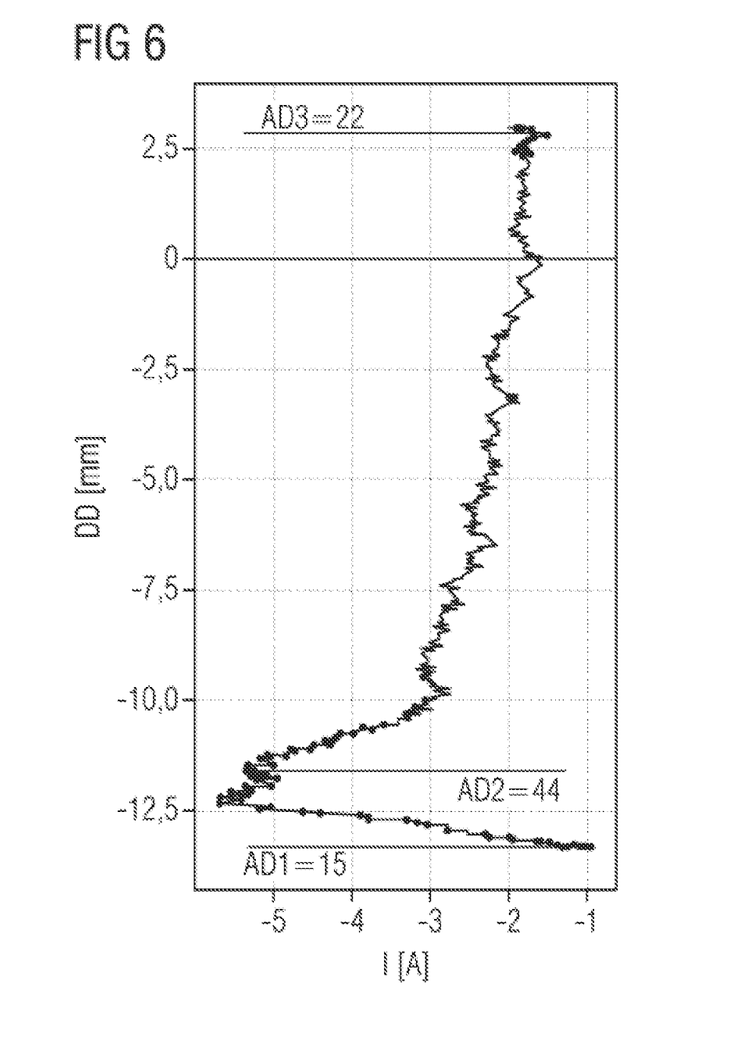
FIGS. 6-7 show graphical plots of exemplary representations of current consumptions as a function of a drilling depth.
Figure 7:
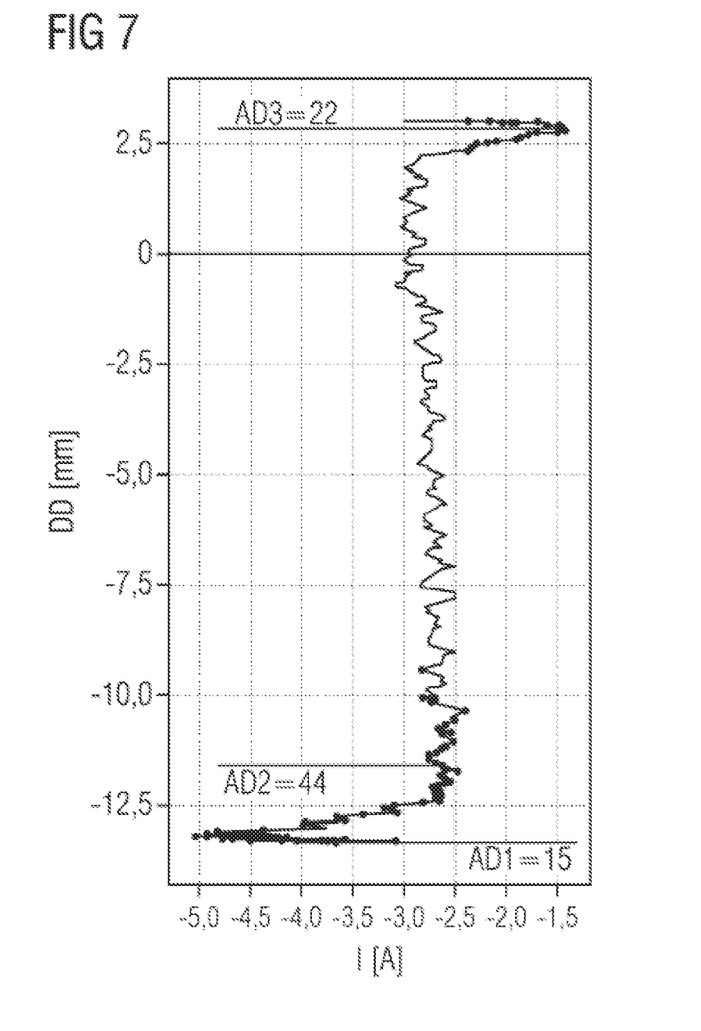

FIG. 6 and FIG. 7 show trends of a current consumption I of the machine over time as a function of the drilling depth DD.

Anomaly densities AD1-AD3 are plotted in each case, which can be used as a criterion for detecting an anomaly.

The anomaly densities AD1-AD3 can be derived from forecast estimate values or anomaly values, but also from smoothed anomaly trends.

Figure 8:
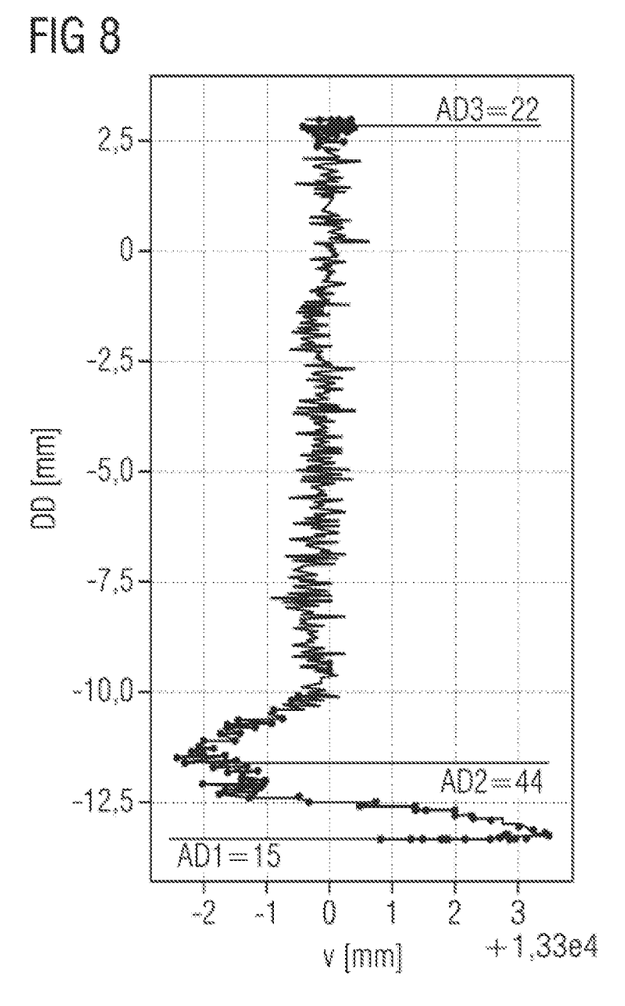
FIG. 8 shows a graphical plot of an exemplary feed speed as a function of the drilling depth.

FIG. 8 shows a trend of the feed speed as a function of the drilling depth. Here, anomaly densities AD1-AD3 are in turn shown.

Figure 9:
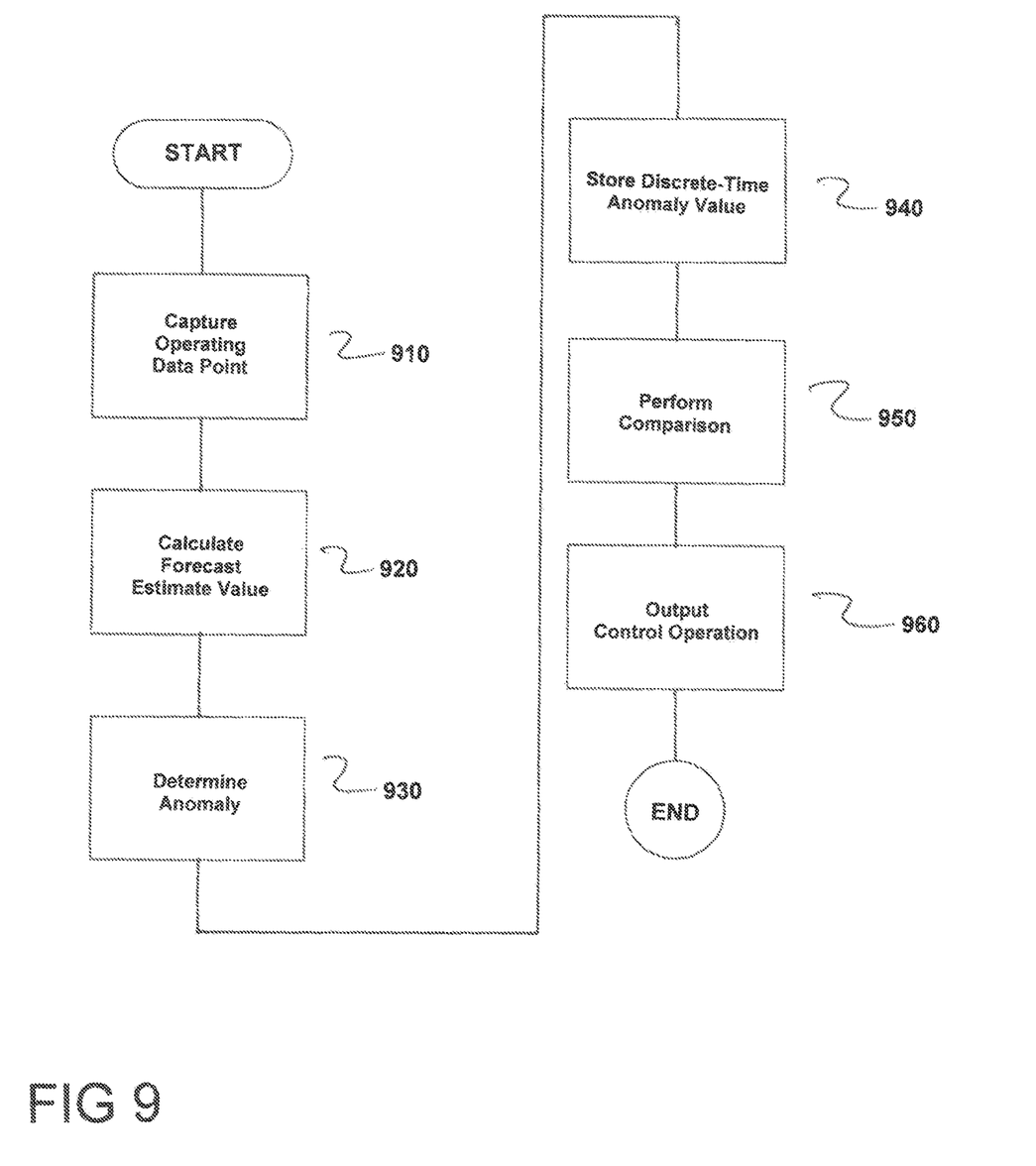
FIG. 9 is a flowchart of the method in accordance with the invention.

FIG. 9 is flowchart of the operating a machine with a tool. The method comprises a) capturing at least one operating data point S1 S4 for at least one of the machine and tool, as indicated in step 910.

Next, b) at least one forecast estimate value F1-F4 is calculated from the at least one operating data point S1-S4 based on a machine learning (ML) model, as indicated in step 920.

Next, c) an anomaly formed as a discrete-time anomaly value AS is determined based on the at least one estimate value F1-F4 by a comparison with a predetermined comparison value for the at least one estimate and detection of a match for an estimate comparison is detected, as indicated in step 930.

Next, d) the discrete-time anomaly value AS is stored in a memory and a trend in the anomaly value AS over time is aggregated to form a smoothed anomaly value SS, as indicated in step 940.

Next, e) the smoothed anomaly value SS is compared with at least one predetermined comparison value for the anomaly and detecting a match for the anomaly comparison is detected, as indicated in step 950.

Next, f) a control operation O1-O4 is output to the machine based on the smoothed anomaly value SS, as indicated in step 960.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a machine with a tool, the method comprising:
   a) capturing at least one operating data point for at least one of the machine and tool;
   b) calculating at least one forecast estimate value from the at least one operating data point based on a machine learning model;
   c) determining an anomaly formed as a discrete-time anomaly value based on the at least one estimate value via a comparison with a predetermined comparison value for the at least one estimate and detection of a match for an estimate comparison;
   d) storing the discrete-time anomaly value in a memory and aggregating a trend in the anomaly value over time to form a smoothed anomaly value;
   e) comparing the smoothed anomaly value with at least one predetermined comparison value for the anomaly and detecting a match for the anomaly comparison; and
   f) operating, monitoring manufacturing parameters of the machine or tool, and controlling the machine or tool via at least one control operation which is output based on the smoothed anomaly value to maintain quality of workpieces independently of changing machine or tool states.

2. The method as claimed in claim 1, wherein at least two operating data points are captured and further processed.

3. The method as claimed in claim 1, wherein at least two estimate values are calculated and further processed.

4. The method as claimed in claim 1, wherein the at least one operation datapoint is one of (i) a rotary or displacement speed, (ii) a torque, (iii) a current consumption and (iv) a temperature.

5. The method as claimed in claim 1, wherein the at least one estimate value is calculated via a Long Short-Term Memory network.

6. The method as claimed in claim 1, wherein the discrete-time anomaly value is determined via an "isolation forest" algorithm.

7. The method as claimed in claim 1, wherein the smoothed anomaly value is implemented by forming a temporal average value.

8. The method as claimed in claim 1, wherein the comparison value is determined in step e) via a method, which is based on machine learning.

9. The method as claimed in claim 8, wherein the machine learning comprises one of (i) a decision tree, (ii) a Bayesian network, (iii) a neural network, (iv) a multi-class support vector machine and (v) a k-nearest neighbor classification.

10. The method as claimed in claim 1, wherein at least one operating characteristic number is taken into consideration in the comparison during step e).

11. An apparatus for optimal operation of a machine with a tool, comprising:
    a sensor module with at least one sensor for capturing at least one operating data point for at least one of the machine and tool;
    an estimator for calculating at least one forecast estimate value from the at least one operating data point based on a machine learning model;
    an anomaly detector for determining an anomaly formed as a discrete-time anomaly value based on the at least one estimate value via a comparison with a predetermined comparison value for the at least one estimate and detection of a match for an estimate comparison;
    memory for storing the discrete-time anomaly value in a memory, a trend in the anomaly value being aggregated over time to form a smoothed anomaly value;
    decision circuitry for comparing the smoothed anomaly value with at least one predetermined comparison value for the anomaly and detecting a match for the anomaly comparison; and
    output circuitry for outputting a control operation to the machine based on the smoothed anomaly value;
    wherein manufacturing parameters of the machine or tool are monitored during operation of the machine or tool which is controlled via at least one output control operation based on the smoothed anomaly value to maintain quality of workpieces independently of changing machine or tool states.

12. The apparatus as claimed in claim 11, wherein the estimator, the anomaly detector and the decision circuitry are placed on an edge included in and connected by the apparatus.

* * * * *